Oct. 3, 1961 L. E. LEE 3,002,410
POWER-OPERATED TOOL HOLDER
Original Filed Jan. 20, 1954 4 Sheets-Sheet 1

INVENTOR
LUTHER E. LEE
ATTORNEYS

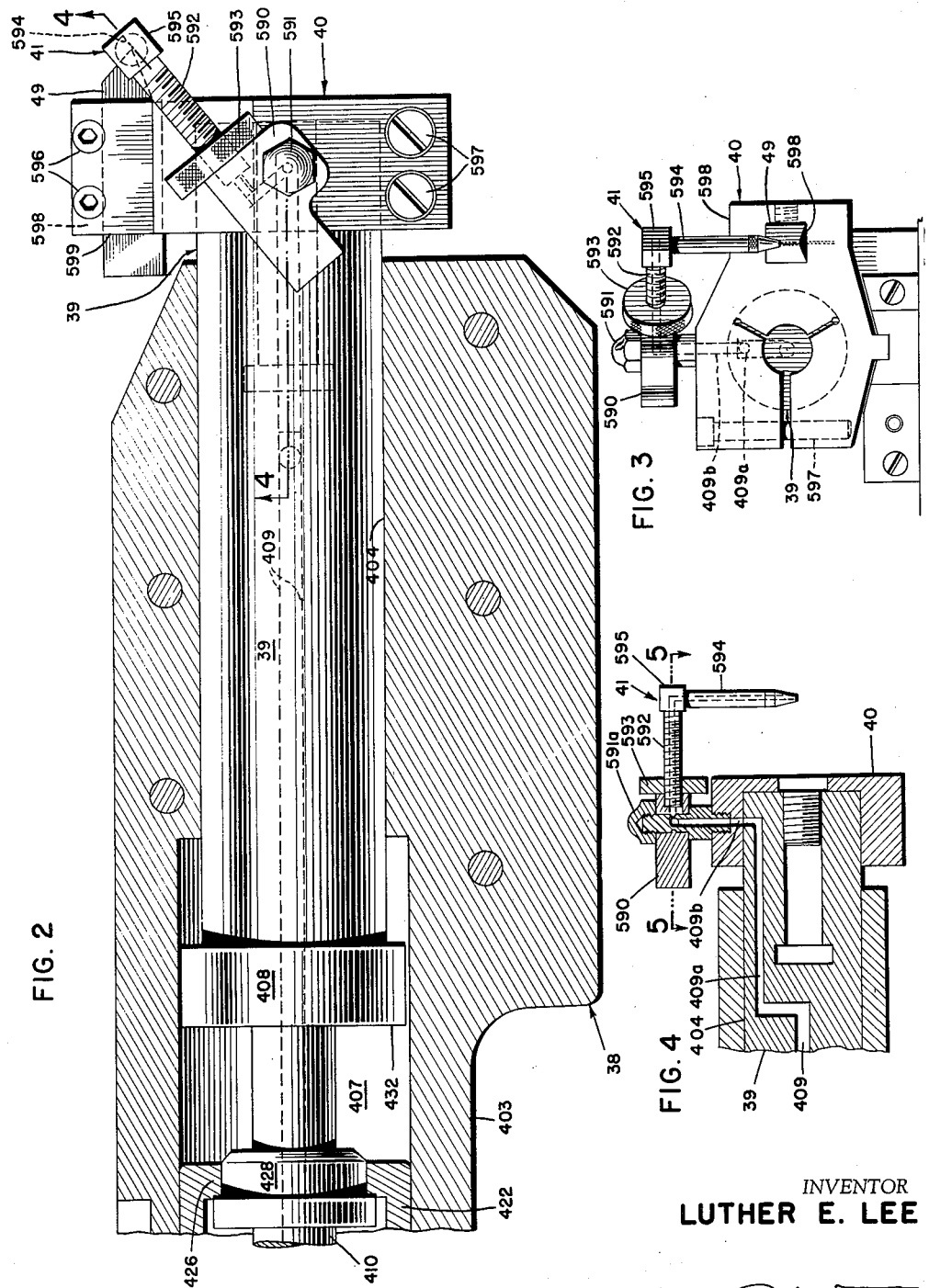

Oct. 3, 1961 L. E. LEE 3,002,410
POWER-OPERATED TOOL HOLDER
Original Filed Jan. 20, 1954 4 Sheets-Sheet 3
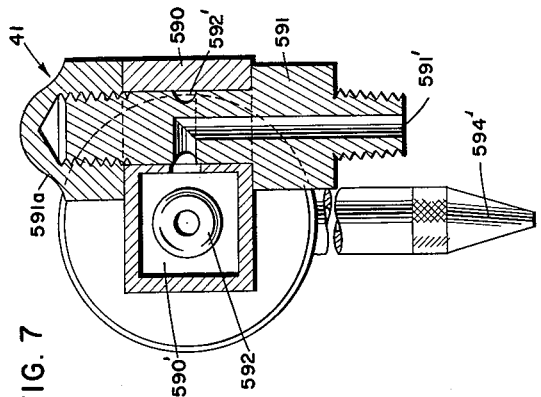
FIG. 7
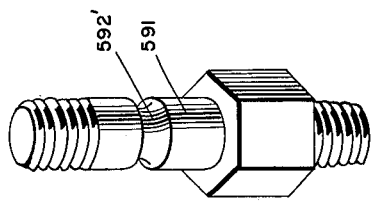
FIG. 8
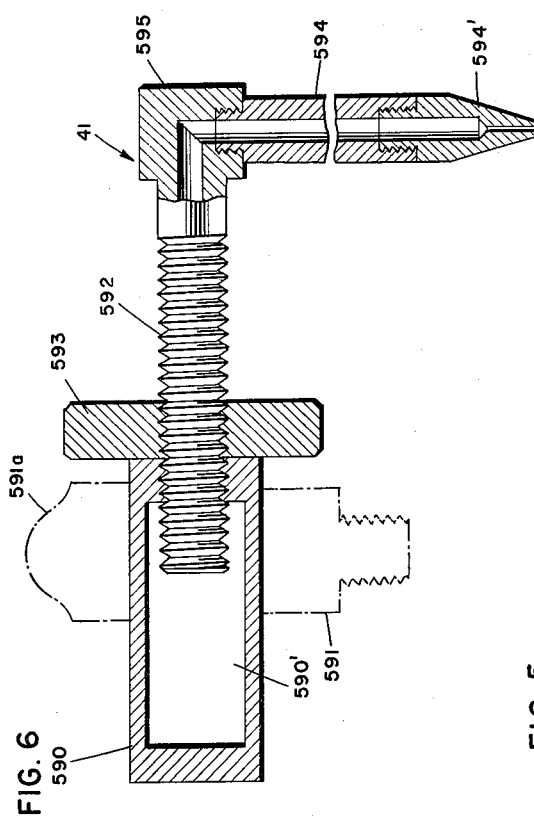
FIG. 6
FIG. 5
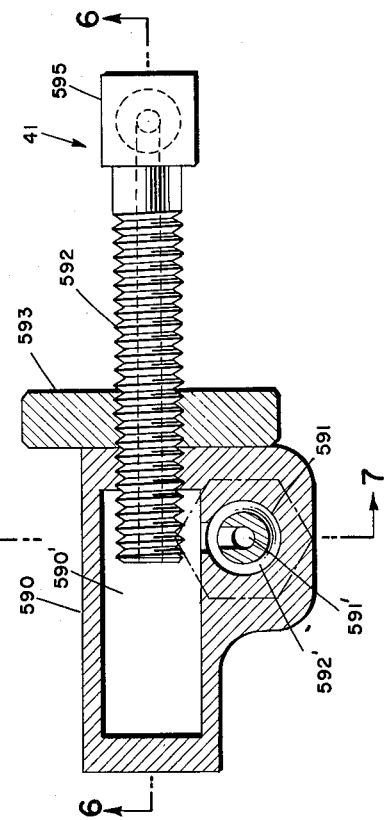
INVENTOR
LUTHER E. LEE
BY
Q. Baxter Warner
Claude Funkhouser
ATTORNEYS

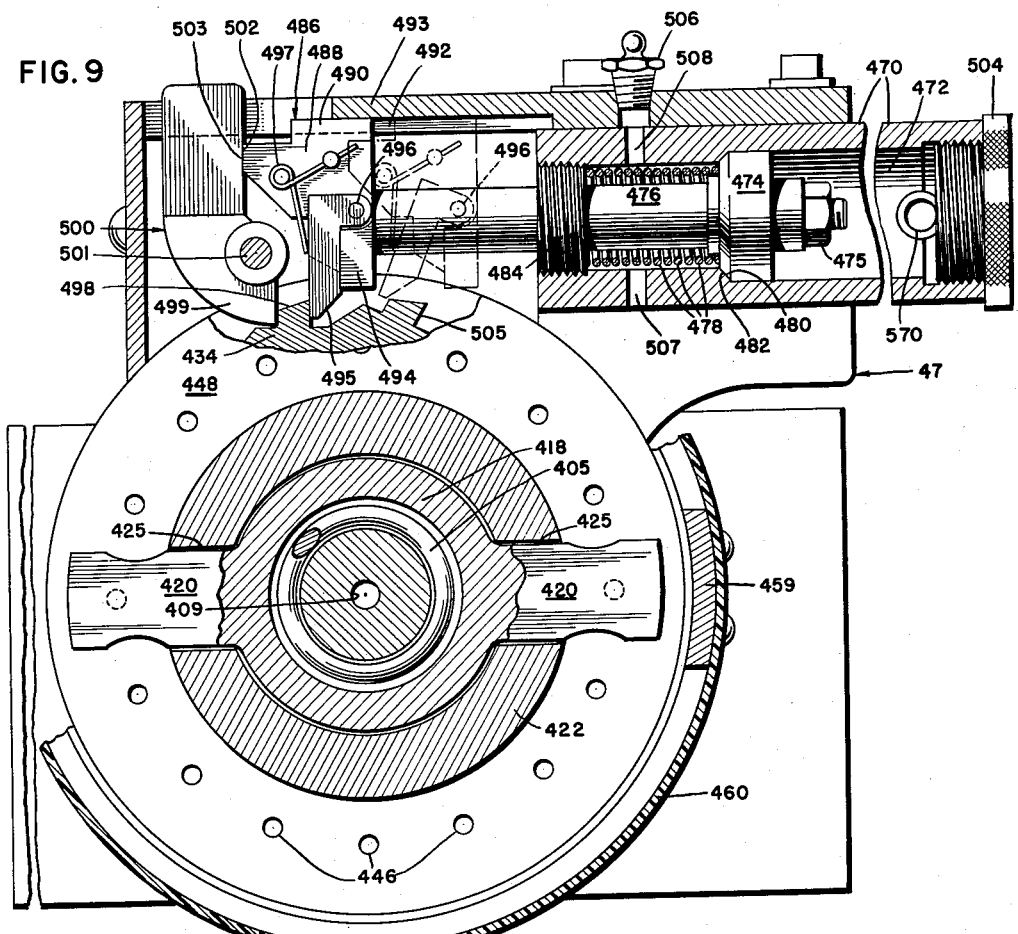
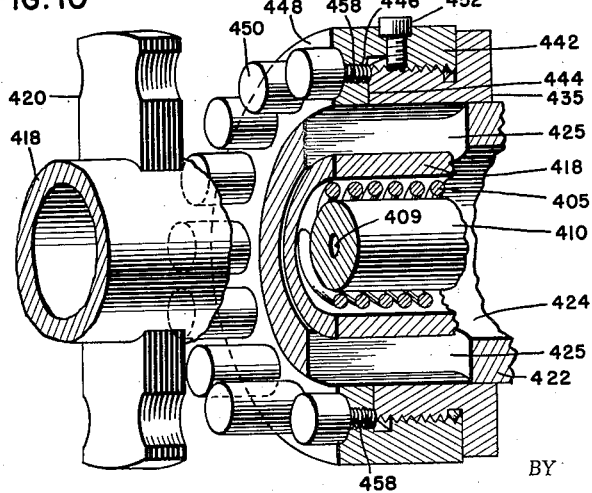

United States Patent Office 3,002,410
Patented Oct. 3, 1961

3,002,410
POWER-OPERATED TOOL HOLDER
Luther E. Lee, 6625 Eastern Ave., Takoma Park, Md.
Original application Jan. 20, 1954, Ser. No. 405,267.
Divided and this application July 31, 1959, Ser. No. 830,967
4 Claims. (Cl. 82—24)
(Granted under Title 35, U.S. Code (1952), sec. 266)

The invention described herein may be manufactured and used by or for the Government of the United States of America for governmental purposes without the payment of any royalties thereon or therefor.

The instant application is a division of application Serial No. 405,267, filed by Luther E. Lee on January 20, 1954 for Machine Tool, now abandoned.

The present invention relates to a tool holding head for machine tools such, for example, as a planer, boring mill, lathe, slotter and the like and more particularly to a fluid actuated tool holding head for turning and chasing operations and for supplying a concentrated directed stream of high velocity pressure fluid onto the cutting bit or within the proximate vicinity thereof during cutting operations.

The present invention contemplates the provision of a novel fluid operated toolholder which will feed the cutting bit into the work in preselected increments for each cut or stage of a cut. Furthermore, in the present invention upon completion of a forward cutting stroke the fluid operated toolholder will be returned automatically to the initial starting position and the toolholder will advance to another cutting increment prior to commencing another working cycle.

Therefore, an object of the present invention is to provide a cooling fluid operated toolholder which cooling fluid is also directed to a selected area immediately adjacent to the cutting edge of a toolbit.

Another object of the invention is to provide a fluid operated toolholder wherein the fluid under high pressure travels therethrough and is projected to a particular area adjacent the cutting edge of a toolbit to prolong life thereof.

A further object of the invention is to provide power means for automatically advancing a toolbit into the work in preselected increments and concurrently therewith supply a cooling fluid to the toolbit.

A further object of the invention is to provide a combination step turning and thread chasing fluid operated toolholder which will automatically advance a toolbit in preselected increments or retract the toolbit in accordance with a work cycle.

Still another object of the invention is to operate a toolholder and a toolbit coolant that is adapted to function wherein the coolant is employed to operate the toolholder.

A still further object of the invention is to provide coolant actuated means for moving a cutting tool into a workpiece and in which nozzle means carried by the coolant actuated means supply the coolant to the cutting tool during the cutting strokes.

An additional object of the invention is to provide a tool actuating device that may be quickly and easily installed on a conventional machine tool without structural modification and which may be used at a relatively high rate of speed for the particular material being employed. By the present invention the number of work setups and tool changes is materially reduced and the work output per man-hour may be substantially increased.

Other objects and many of the attendant advantages of this invention will be readily appreciated as the same becomes better understood by reference to the following detailed description when considered in connection with the accompanying drawings wherein:

FIGS. 1 and 2 taken together illustrate an enlarged longitudinal sectional view of the fluid operated turning and chasing head and the toolholder and fluid nozzle carried thereby;

FIG. 3 is a front elevational view of the toolholder and fluid nozzle structure;

FIG. 4 is a fragmentary sectional view taken on the line 4—4 of FIG. 2;

FIG. 5 is an enlarged sectional view taken on the line 5—5 of FIG. 4;

FIG. 6 is a sectional view taken on the line 6—6 of FIG. 5;

FIG. 7 is a sectional view taken on the line 7—7 of FIG. 5;

FIG. 8 is a detailed perspective view of the securing bolt for the toolholder;

FIG. 9 is a transverse sectional view taken along the line 9—9 of FIG. 1 and illustrating the indexing mechanism structure; and FIG. 10 is a detailed perspective view, partially in elevation and partially in section, illustrating the spacer block collar assembly.

Figure 1:
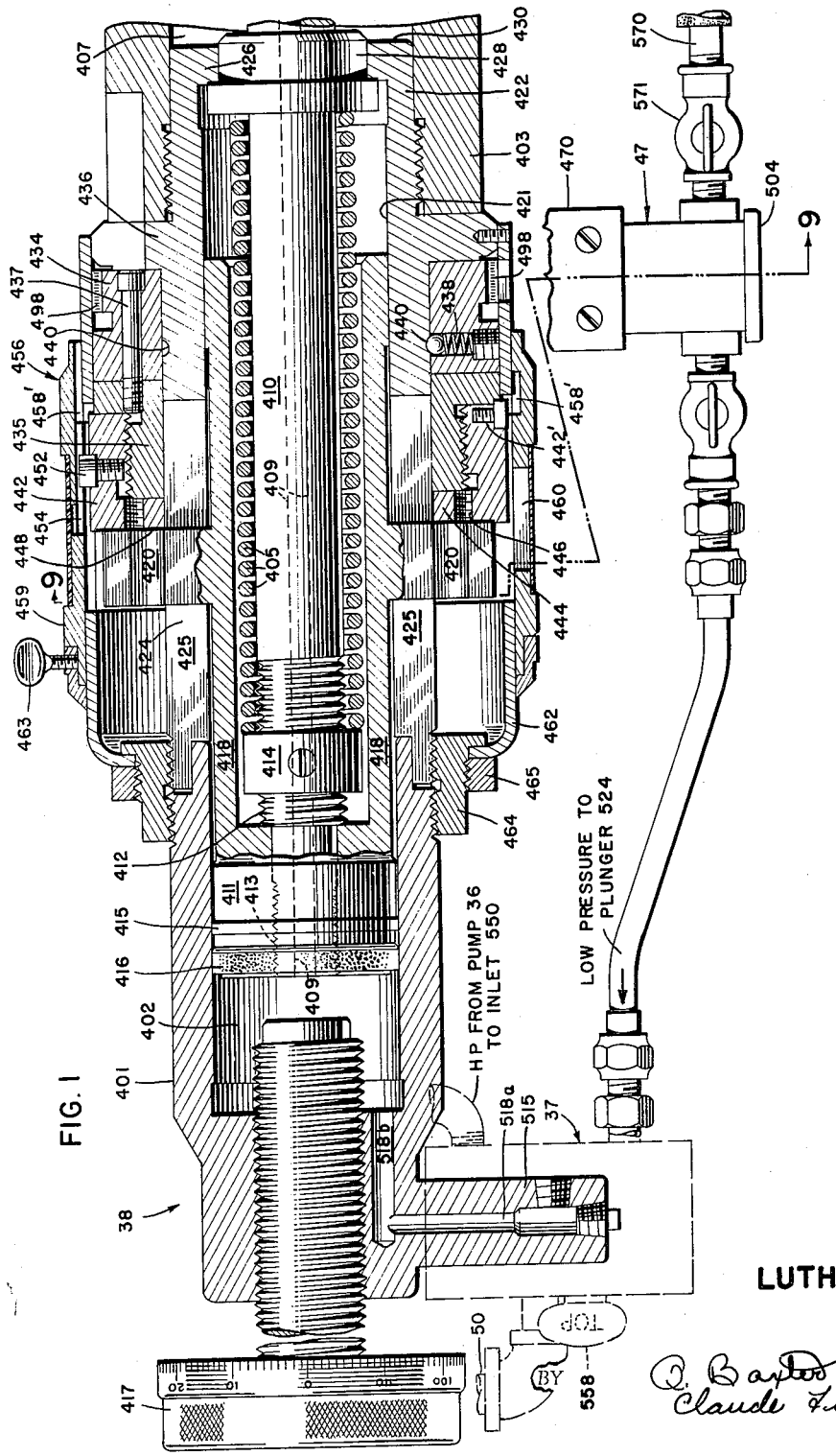

Referring to the drawings and more particularly to FIGS. 1 and 2 there is illustrated head structure constructed in accordance with the present invention and generally indicated by the numeral 38, comprising a housing 401 having a chamber 402 for receiving fluid under pressure from a pump or the like (not shown) to advance a ram 39, FIG. 2. The ram 39 supports a toolholder 40, a toolbit 49 and a nozzle assembly 41 on the terminal or working end thereof, as best shown on FIGS. 2 and 3 for movement into a workpiece as the ram 39 is advanced. An indexing mechanism generally indicated by the reference character 47, FIG. 9, is mounted on the housing 401, the mechanism being adapted to condition the head 38 for extent of successive ram movement by selectively positioning a limiting means in the housing to govern ram projection as pressure fluid is admitted into chamber 402 in the housing 401 of the head 38 from a pump (not shown).

To provide for a rigid mounting of the turning and chasing head 38 to the compound slide on the tool carriage of a lathe or the like such, for example, as disclosed in copending patent application Serial No. 405,267, a mounting bracket 403 is bored centrally and threadedly engaged with the ram end section of the head by the guide bushing 422, FIGS. 1 and 2. In FIG. 2 it will be noted that the bore 404 in bracket 403 is enlarged to form a chamber 407 to receive the enlarged rear head member or flange 408 formed on the ram 39 which is slidably disposed within aforesaid bracket bore. The toolholder assembly 40, as best shown on FIGS. 2, 3, and 4 includes a nozzle assembly 41 and is mounted on the forward or working end of the ram 39, to be advanced into the work as the ram is moved within the housing 401. Pressure fluid supplied to the chamber 402 in housing 401 from a suitable high pressure source (not shown) is conducted through a bore or passageway 409, which extends axially through piston rod 410 and ram 39, FIGS. 1 and 2 to connect with the nozzle assembly 41 from which the fluid is adapted to be ejected in a fine stream onto the toolbit 49. The piston rod 410 is provided with a piston 411 secured thereto in any suitable manner and movable longitudinally within chamber 402 in housing 401, FIG. 1. It will be understood that piston 411 is movable outwardly as the aforesaid fluid pressure is applied thereto, and movable rearwardly by the spring 405 disposed about the rod 410 in engagement with a nut 414 carried on the threaded portion 412 of rod 410, the spring being adapted to return the piston to an initial position. As more clearly shown on FIG. 1 the piston head 411 is mounted on the reduced threaded portion 413 of the rod 410, and the head 411 is provided with a ring 415 and a sealing gasket 416 thereby to retain the pressure fluid within chamber 402. A dependent skirt or sleeve 418, FIG. 1 is disposed within housing 401, the skirt or sleeve may be integral with the piston head 411, or fastened thereto in any conventional manner, the sleeve being disposed about the spring 405 and extending a substantial distance axially within the housing 401, as best shown in FIG. 1. The sleeve is provided with a pair of oppositely disposed lugs or arms 420, FIGS. 9 and 10 and constituting an abutment for engagement with a limiting device (to be more fully described hereinafter) when the piston is moved forwardly in the aforesaid manner thereby to determine the position of the cutting tool in forward ram movement. As illustrated in FIG. 1 the indexing control dial 417 is in threaded engagement with the end portion of the housing 401 and serves as a limit stop during retraction of the piston.

The sleeve 418 on head 411 extends axially along the housing 401 and is disposed within the bore 421 provided in guide bushing 422, the bushing being supported by threaded engagement with the rear end of mounting bracket 403, FIGS. 1 and 2. The rear section 424 of the bushing 422 is provided with diametrically opposed slots 425 to accommodate the lug 420 on the sleeve 418 and to guide the lugs during axial movement of the piston 411. The ram end of the bushing 422 is provided with a shoulder 426 forming a ledge for supporting a mating shouldered buffer brushing 428 on the end of the piston to provide an end stop for the spring 405, FIG. 1. The buffer bushing 428 projects a short distance beyond the forward surface 430 of the bushing 422, and, at the end of the retracting movement of the ram 39, the face of the bushing being struck by the rear face 432 of the enlarged head portion 408 of the ram, FIG. 2.

When fluid pressure in the chamber 402 of housing 401 decreases below the force required to overcome the tension of spring 405, the spring encircling the rod 410 is free to expand axially forcing the nut 414 and piston 411 rearwardly toward the inner end of the indexing control dial 417. With the residuum of pressure of the pressure fluid in the chamber 402, remaining after pressure in the chamber is relieved, rearward movement of the ram is cushioned as the piston approaches the rearward limit in its retracting movement.

A rotatable indexing ring 434 (see FIGS. 2 and 9) encircles the guide bushing 422 and bottoms against the radially projecting shoulder 436 integral with the guide bushing 422. It will be noted, FIG. 1, that a spring pressed detent 438 rides in the circumferential groove 440 on the bushing 422 to restrict axial displacement of the ring with respect to the bushing. Sleeve collar 435 which is externally threaded also encircles the guide bushing 422 and is anchored to the ring 434 by the connecting bolt 437, FIG. 1, so that movement of the ring 434 will be imparted similarly to the collar 435. In threaded engagement with the sleeve collar 435 is an outer collar 442 that has an annular ring 444 integrally formed on the collar with threaded holes 446 uniformly spaced about the rear face 448 of the ring to accommodate, for turning operations, a plurality of accurately dimensioned spaced blocks 450, FIG. 10. A key illustrated by the bolt 452, FIG. 1, is threaded into the outer collar 442 and will slide in a keyway 454 provided in the inner periphery of the cover member 456 to prevent rotation of the outer collar 442; and thereby provision is made for axial relative movement between collars 435 and 442 as the ring 434 is rotated by the indexing mechanism 47, as best shown on FIG. 2 and (to be described hereinafter). Therefore, during thread chasing operations the lugs 420 on the piston skirt 418 will strike and bottom against the rear face 448 of the ring 444 at each cutting stroke to progressively advance the tool into the work in preselected increments as the outer collar 442 is advanced axially upon rotation of the indexing ring 434.

For turning operations a plurality of accurately dimensioned spacer gage blocks 450, as shown in FIG. 10, are arranged in pairs of equal length for mounting on the rear face of the outer collar 442 in the spaced threaded holes 446 provided to receive them. It will be understood that the aforesaid blocks 450 are in pairs of equal lengths and mounted diametrically opposite each other by any suitable means such as retaining screws 458 either made integral with the block or by employing the fastening means or blocks shown in the U.S. Patent No. 2,641,151. Since the similar blocks of a pair are spaced 180° apart around the ring 448, the lugs 420 will be limited equally in their forward movement by striking against equal length blocks. In the embodiment shown in FIG. 9 there is illustrated a collar capable of accommodating eight pairs of spacer blocks 450, however, this may be varied depending on (1) the indexing ring diameter, (2) the width of the lugs at the contact points with the blocks, and (3) the width or diameter of the spacer blocks.

It will be appreciated that in order to utilize the spacer blocks 450 during a turning operation, the blocks mounted on the collar 442 must be disposed accurately in selected increments by the indexing mechanism 47, FIG. 9, which rotates the ring 434, FIGS. 1 and 9. Outer collar 442 on which the spacer blocks 450 are mounted threadedly engages the collar 435 so that upon ring rotation the collar 442 may be rotated during an indexing operation. Conventional locking means, as by a set screw 442' may be used to lock the collars 442 and 435 to prevent relative rotation therebetween during turning operation. Since the cover member 456, FIG. 1, is provided with a keyway 454 that prevents rotation of the collar 442 by restricting movement of the key 452 to an axial direction during chasing operations, the cover must be displaced axially so that an internal circumferential groove 458' will be positioned adjacent the key 452 and will permit the collar 442 to rotate with the sleeve collar 435 in the cover when driven by movement of the aforesaid indexing ring 434 thereby enabling the collar 442 on which the blocks are mounted to be rotated to a new position.

The cover member 456 enclosing the spacer blocks and collars has a cylindrical shield 459 with openings therearound to mount transparent windows 460, FIGS. 1 and 9, which will provide a visual indication of the orientation of the internal mechanism. The shield holder 462, FIG. 1, which is suitably recessed to support the shield 459 by a thumb screw 463 is retained on the bushing 464 by a lock ring 465. Suitable indicia (not shown) may be inscribed or mounted on the shield to cooperate with suitable markings on the collar 435, or some other suitable element that advances with the tool, to indicate tool advance. By removing the locking ring 465 the shield holder 462 may be displaced rearwardly so as to expose the collar 442 on which the spacer blocks 450 are mounted.

Thus, it will be apparent that by rotating the collar 442 to bring selective pairs of the blocks 450 in line with the lugs 420, as shown in FIG. 10, the axial movement of the piston skirt 418 and its attached piston 410, FIG. 1, and ram 39, FIG. 2, can be governed accurately to within prescribed limits.

In order to position automatically successive pairs of spacer blocks 450 or advance the collar 442 axially there is provided an indexing mechanism 47, shown clearly in FIG. 9. The aforesaid indexing mechanism 47 comprises a laterally extending housing 470 which is supported on the toolholder head and is bored to provide a cylinder 472 in which the piston 474, secured as by the bolt 475 to a piston rod 476, reciprocates. Compression spring 478 surrounds shaft 476 and normally urges the piston 474 and the rod 476 to the right, as shown in FIG. 9. This piston is preferably a slightly loose fit in the cylinder to assure easy action, and the forward end of the piston is chamfered at 480 to provide a space which will seat against a correspondingly chamfered face 482 to effectively seal the parts against the escape of air past the piston when the piston is in its extreme left position, as shown in FIG. 9. A threaded bushing 484 guides the rod 476 and forms an abutment for spring 478. Port 507 in the base of the housing 504 will vent the back side of the piston 474, and port 508 will permit lubricant from the fitting 506 to enter and lubricate rod 476 facilitating sliding movement in the cylinder 472.

A pawl or step by step indexing mechanism 486, FIG. 9, is provided on the left-hand end of the shaft 476 and includes a guide block 488, one side 490 of which rides in a groove 492 in a side plate 493 to restrain the piston shaft from rotation. A portion of guide block 488 extends from the opposite side of the piston shaft 476 to form an abutment 494. A toe 495 is slotted centrally to extend on both sides of the guide block 488 and is hingedly mounted thereto at 496. A small wire spring 497 normally urges this toe into engagement with the abutment 494. The indexing ring 434 is provided around the lower periphery with a plurality of teeth, one of which, 498, is shown seized between the tip of the toe 495 and the tip 499 of the detent arm 500 pivotally mounted at the fulcrum 501 with the piston shaft 476 in its extended position, as shown in FIG. 9. The end 502 of the guide block 488 bears against the heel 503 of the detent arm 500 causing it to pivot around the fulcrum 501 to urge the tip 499 of the detent arm 500 into positive engagement with one side of the index tooth 498.

In the indexing operation it will be noted that as an impulse of the actuating fluid enters the bore 472 of the housing 470 through the coupling 504, or through the side of the cylinder as shown in FIG. 9, it will force the piston 474 to the left causing the toe 495 to engage with one side of an index tooth 498 and thereby rotate the ring 434, FIG. 9, and the collar 435, FIGS. 1 and 10. And for chasing operations, with the cover member positioned so as to prevent rotation of the collar 442 and permit axial movement only, the collar 442 will advance in equal increments in advance of the piston limiting lugs 420.

It will be understood, that when the supply of actuating medium to the cylinder is cut off and the indexing cylinder 472 is exhaused, the piston 474 will be returned to the right by compression spring 478 and the toe 495 will pivot about the point 496 to clear the next succeeding tooth 505, see movement shown by broken line view in FIG. 9. Once clear the spring 497 will snap the toe back into engagement with abutment 494 so that the next impulse of the actuating medium in the indexing cylinder will move the next tooth 505 into the position formerly occupied by the tooth 498. Since the detent 500 is free to pivot about fulcrum point 501 when the end 502 is clear of the detent heel 503, thereafter, the detent tip 499 will not interfere with the rotation of the ring 434 until the piston again reaches the left-hand limit of its movement and a new tooth is engaged between the detent tip 499 and the toe 495.

The turning and chasing head may be controlled by a suitable valve assembly such, for example, as the valve assembly disclosed and claimed in U.S. Patent 2,882,930 and is adapted to be mounted on the projection 515 of the head 38, FIG. 1, to control the admission and exhaust of the high pressure fluid from a pump (not shown) to the head 38, the pump being similar to the pump disclosed and claimed in U.S. Patent 2,802,424. It will be understood that the valve may be secured to the projection 515 in any suitable manner to maintain the valve in position and in communication with the fluid passage provided in projection 515 whereupon high pressure may be admitted into head 38 as the valve is operated.

The operation of the step turning and chasing head will be described (1) for a chasing operation and (2) for a turning operation. For step turning operation the spacer block construction of FIG. 10 is used to control the depth of cut and the threaded collar 442 of FIG. 1 is used to control the depth of cut in thread chasing operation. This collar 442 must be advanced axially without rotation, therefore, it is held against rotation by engagement of key 452 positioned within the elongated keyway 454 in the cover member 456 during a thread chasing operation. The cover is maintained in the position as shown in FIG. 1, by screw 463 until nut 442 contacts 435. When this occurs the cover will be rotated by the indexing mechanism, this rotation of the cover indicating to the operator that the final or spring cut, as it is known in the art, is being made.

During the set-up procedure for chasing a thread, the ram 39 is in the position as shown in FIG. 1 with the toolbit 49, FIG. 2, in engagement with the workpiece. With the toolbit in this position pressure in chamber 402 is released by valve means (not shown) similar to the aforesaid U.S. Patent 2,882,930 whereupon the ram structure is moved rearwardly by spring 405 until it engages member 417 which is set to an amount substantially equal to the depth of thread to be cut in the workpiece. When this has been done the collar or nut 442 will be disposed in spaced relation with respect to arm 420 and thus upon rotation of cover 456 the nut 442 by reason of the aforesaid slot and pin connection may be adjusted with respect to arm 420. By this arrangement the housing together with ram and toolbit are movable toward the workpiece such, for example, as by a lathe carriage (not shown) a distance equal to the total depth of the threads to be cut in the workpiece and in preselected increments.

It will be understood that graduated indicator means on member 459 are employed to indicate progressive advance of the toolbit by correlating the initial position of the toolbit with respect to subsequent passes over the workpiece. Upon initial adjustment of the head in the aforesaid manner high pressure fluid from the pump (not shown) is admitted into the turning and chasing head 38 by way of passage 518a as the valve is operated. Prior to the entry of the pressure fluid from a high pressure source into the head 38, low pressure actuating medium is admitted to the indexing mechanism 47 through the line 570 into the indexing cylinder 472 moving the piston 474 in the cylinder and compressing the index compression spring 478 thus moving the piston shaft 476 axially, FIG. 9. Toe 495 on member 500 having engaged tooth 498 on the indexing ring 434 rotates the indexing ring and collar 435 to advance the collar 442 axially allowing the oppositely extending piston supported lugs 420, FIG. 9 and 10, to advance the ram 39, FIG. 2, in selected increments into the work. Overtravel of the indexing ring 434 is prevented by tip 499 which engages the opposite side of the tooth 498 on ring 434 and forms a part of the arm 500 pivoted in the index housing 470, as at 501 and as best shown on FIG. 9. This tip 499 is retained in its tooth engaging position by the oppositely engaging body portion 503 on detent 500 against which the end 502 of the guide block 488 bears. As pressure builds up in the index chamber 472 the tooth 498 is securely clamped between toe 495 and tip 499 on detent arm 500.

High pressure fluid from the pump (not shown) will be pumped into a suitable head control valve (not shown) and will flow into the chamber 402 in housing 401 to force piston 411 and ram 39 outwardly, FIGS. 1 and 2. To further assure an accurate timing sequence so that the indexing step is performed prior to the movement of piston 411 the area of the index piston 474 and the strength of the spring 478 are so proportioned that a relatively small pressure will be sufficient to complete the indexing operation.

As pressure in the chamber 402 in the head 38 increases due to the admission of high pressure fluid the piston 411 moves outwardly and carries piston rod 410, ram 39 with the toolholder 40 and toolbit 49 on skirt 418 will strike the rear surface 448 of the collar 442 to position the tool accurately in the desired cutting stroke position. Lugs 420 are cushioned in their movement against the collar by the initial low entering pressure of the fluid which builds up gradually to pressures suitable for discharging the fluid onto the toolbit, normally in excess of 900 p.s.i. As the pressure of the incoming fluid builds up in the chamber 402 of head 38 at high pressure and finely concentrated stream of coolant will be directed through the passage 409 in the piston 410 and ram 39 through the toolholder and nozzle assembly and pass onto the toolbit.

As the fluid pressure in the chamber 402 is released sufficiently, the compressed spring 405 disposed between elements 414 and 428 will rapidly move piston 411 rearwardly retracting the ram 39, the toolholder assembly 40 and the toolbit 49 from the workpiece. This retraction continues until the enlarged section 408 of the ram 39 strikes the under surface of the buffer bushing 428, FIG. 2, causing it to move rearwardly slightly to help cushion the sharp rearward blow. Further buffing action results from the relieved fluid pressure within the chamber 402 of the head 38 which now acts as a shock absorber during retracted movement of the piston and ram. When a carriage return apparatus is employed in combination with the lathe carriage such, for example, as disclosed in the copending application Serial No. 405,267, filed by Luther E. Lee, January 20, 1954, for Machine Tool, to reposition the toolholder head to the starting position on the workpiece for another forward cutting stroke, the head will be retracted during the return stroke to clear the workpiece and will be indexed a predetermined increment into the workpiece at the starting position of the next forward cutting stroke.

It will be understood that the above-described construction can be employed for turning operations whenever it is desired to make successive cuts over a surface. However, if it is desired to employ the device for "step turning" operations the devise may employ spacer blocks of the type shown in FIG. 10 and in this instance the cover member 456 is displaced rearwardly to permit the spacer blocks 450 to be selectively assembled on the collar 442 as shown in FIG. 10. As illustrated, the collars 435, 442 are drawn upon each other and relative movement between collars is impeded by the aforesaid locking screw 442' carried by collar 442 and in locking engagement with inner collar 435. Upon selectively positioning the spacer blocks the cover member is oriented so that the key 452 may rotate with the collars 442, 435 in the groove 458 in the cover member 456. Operation of the indexing mechanism with the spacer blocks is similar to that described above for the chasing operation.

Suitable liquid coolant, such a soluble oil or lard oil, supplied at high velocity and under pressure in excess of 900 p.s.i. at the nozzle outlet is directed in an extremely fine concentrated stream to impinge against the toolbit adjacent the cutting edge of the tool, as best shown on FIG. 3, so that the heat generated during the cutting operation will be dissipated immediately. It has been discovered that by this method of projecting a high pressure coolant onto a toolbit a fluid envelope is formed about the tool and the surface on the workpiece being cut which results in increased tool life at greater cutting speeds, as well as finer surface finishes. Several theories have been advanced to account for the startling increased tool life at higher cutting speeds, namely that: (1) liquid coolant emerging from a fine nozzle strikes the tool in a concentrated stream at high pressure and high velocity to rapidly absorb the sensible heat in the tool and almost instantaneously a portion of the coolant flashes into a vapor state absorbing the latent heat required for vaporization from within the cutting zone, while in this vapor state molecules of coolant under partial pressures will penetrate into areas that will not admit a solid stream of liquid coolant, thereby maintaining the tool temperature relatively cool which in turn prevents rapid tool deterioration; or (2) the high pressure and velocity coolant directed as a concentrated jet stream against the vital area will absorb sensible heat on the tool and by a capillary action produced within the minute serrations on the work and toolbit, assisted by the reduced pressure zone formed by the cavity adjacent the point of metal removal, will penetrate into the cutting zone at the point of metal disengagement and in this cavity the coolant will flash into a vapor state absorbing additional heat in the converison to a gaseous state; (3) by the capillary action described in (2) may form a "fluid pad" on which the metal being removed will travel and thereby retard tool wear; or (4) a combination of two or more of the above theories.

In order to provide convenient control over the flow of the pressure fluid the present system is provided with a supply conduit 409 through the piston rod 410 and ram 39 through which the flow of pressure fluid is directed to the nozzle assembly 41, as best shown on FIGS. 1 and 2. As best illustrated in FIG. 4 the nozzle bracket 590 is securely mounted on the toolholder 40 by the bolt 591 and a cap nut 591a in threaded engagement therewith, the bolt having a passage 591' in communication with an annular groove 592', the groove being in communication with a reservoir 590' formed in bracket 590, FIG. 7. An adjustable threaded nipple 592 is carried by the bracket 590 and retained in the locked position on the bracket by the lock nut 593, passes the coolant to an appropriate nozzle head 594 through the elbow 595. As best shown in FIG. 6, the nozzle head 594 is provided with a nozzle tip 594' having an orifice of from 0.005" to 0.020" in diameter depending on the work application and cutting speeds. It will be understood that by reason of the nipple 592 and the bolt 591 and cap nut 591a the nozzle assembly may, if desired, be adjusted with respect to the toolbit and workpiece. For example, the nozzle may be moved to and from the point of the toolbit and accurately with respect thereto.

The toolholder 40 that supports the nozzle assembly 41 is step bored centrally and slotted appropriately to accommodate a portion of the forward end of the ram about which the toolholder is attached and held frictionally thereon by the bolts 597, FIG. 3. A suitable tool slot 598 is positioned laterally from the central bore on the toolholder abutment 599 through which the toolbit securing bolts 596, FIG. 2, pass to retain the toolbit 49 in position relative to the work and the nozzle head 594. To provide for ready access and adjustment to the toolbit 49 and the nozzle assembly 41 the toolbit 49 is positioned with the cutting edge facing downwardly, however, it will be apparent that the tool may be positioned in a conventional manner with the nozzle directed thereon from another position. It is necessary that a passage 409a be provided through a section of the toolholder in communication with the bore 591', groove 592, and reservoir 590' to permit passage of the pressure fluid through the ram 39 by way of passages 409 and 409b and into the nozzle 594 by way of nipple 592 and elbow 595.

In view of the foregoing, it will be apparent that a novel power operated turning and chasing head has been devised which will automatically advance a toolbit in preselected movements or retract the toolbit in accordance with a desired work cycle and in which a coolant is directed under extremely high pressure and at a high velocity to a selected area immediately adjacent to the cutting edge of the toolbit.

Obviously many modifications and variations of the present invention are possible in the light of the above teachings. It is therefore to be understood that within the scope of the appended claims the invention may be practiced otherwise than as specifically described.

What is claimed is:

1. In a power operated turning and chasing head for a machine tool, the combination of a housing having a hydraulic chamber therein, means including a reciprocable cutter support mounted within said housing, a cutter carried by said cutter support and movable therewith, resilient means for urging said support rearwardly to retract the cutter from a workpiece, a fluid connection in communication with said chamber for supplying coolant fluid under pressure to the chamber to force the cutter support outwardly against the resilient means and the cutter into the workpiece, indexing means rotatably mounted within said housing and operatively connected to said cutter support to control axial advance of said support in selected increments, a threaded collar connected to said indexing means and engageable by said cutter support and advanceable axially in response to rotation of said indexing means for effecting preselected displacement of the cutter support, means including a pin carried by said collar for rotating and positioning the collar in predetermined spaced relation with respect to the support to vary the axial advance of the support, and means in said cutter support in communication with chamber for supplying said pressurized coolant fluid to the cutter and workpiece as said fluid is supplied to the chamber.

2. A power operated toolholder and control therefor for use with a lathe on which a workpiece is mounted for rotation comprising; a housing constructed and arranged to be mounted on a movable member, a coolant liquid operated ram movable within said housing in response to sequential admission of pressurized coolant fluid therein, said ram being progressively advanceable toward the workpiece in preselected movement, gas actuated indexing means for limiting advancement of the toolholder toward a workpiece in preselected increments, means in said housing for admitting said coolant fluid therein to advance the ram into the cutting position, said indexing means comprising a rotatable ring provided with a threaded sleeve, an adjustable collar in threaded engagement with said sleeve and axially movable by said sleeve as the ring is rotated, a pawl included in said indexing means and connectable and disconnectable from said ring to rotate the ring in a step by step movement in response to sequential admission of gas under pressure to the indexing means for progressively advancing the ram toward the workpiece in preselected increments, means including a rotatable member on the housing for adjusting said collar with respect to said ram to vary the axial advance of the ram, a toolbit carried by said ram and movable into a workpiece as the ram is advanced toward the workpiece, and means including a conduit in said ram in communication with said coolant fluid within said housing for directing said coolant fluid onto said toolbit.

3. In a power operated turning and thread chasing head for a machine tool, the combination of a housing having a hydraulic chamber therein, means including a reciprocable cutter support mounted within said housing, resilient means for urging said cutter support rearwardly to retract the cutter from a workpiece, a fluid connection in communication with said chamber for supplying coolant fluid under pressure to the chamber to force the cutter support outwardly against the resilient means and the cutter into engagement with the workpiece, indexing means mounted within said housing and operatively connected to said cutter support for controlling axial advance of said support in selected increments, a threaded sleeve included in said indexing means, a collar slidably and rotatably mounted within said housing in threaded engagement with said sleeve and adjustable thereon with respect to said cutter support for controlling axial advance of the cutter support, means including a rotatable member on the housing and cooperating with said collar for adjusting said collar with respect to said cutter support to effect preselected displacement of the support, and means in said support in communication with the chamber for supplying said pressurized coolant fluid to the cutter and workpiece as the fluid is supplied to the chamber.

4. In a power operated turning and chasing head for a machine tool comprising; a housing having a hydraulic cylinder therein, a ram structure having a conduit extending therethrough and reciprocable in said hydraulic cylinder, a piston mounted on one end of said ram and disposed within said cylinder, a cutter detachably secured to the other end of said ram, an elongated sleeve carried by said piston and having a pair of diametrically disposed stop lugs formed thereon, a nut disposed within said housing adjacent said piston and displaceable axially with respect to said stop lugs, a collar rotatably mounted on the housing in threaded engagement with said nut for displacing the nut axially in response to rotation of the collar to advance the nut with respect to said stop lugs, indexing means on the collar for rotating the collar for advancing the nut in preselected increments, means including a member rotatably mounted on said housing and operatively connected to said nut for moving said nut with respect to said stop lugs to effect preselected displacement of the ram and cutter, and means on the housing in communication with said hydraulic cylinder and the conduit for directing coolant fluid against the piston to cause axial movement thereof and to provide coolant fluid for said cutter during a cutting stroke.

References Cited in the file of this patent

UNITED STATES PATENTS

| | | |
|---|---|---|
| 1,317,711 | Landgraf | Oct. 7, 1919 |
| 1,950,039 | Smith et al. | Mar. 6, 1934 |
| 2,570,592 | Price | Oct. 9, 1951 |
| 2,641,151 | Lee | June 9, 1953 |